(12) United States Patent
Beattie, Jr.

(10) Patent No.: US 8,250,967 B2
(45) Date of Patent: Aug. 28, 2012

(54) AUTOMATIC TRANSMISSION SERVO

(75) Inventor: James C. Beattie, Jr., Baltimore, MD (US)

(73) Assignee: ATI Performance Products, Inc., Baltimore, MD (US)

(*) Notice: Subject to any disclaimer, the term of this patent is extended or adjusted under 35 U.S.C. 154(b) by 806 days.

(21) Appl. No.: 12/292,760

(22) Filed: Nov. 25, 2008

(65) Prior Publication Data
US 2009/0165638 A1 Jul. 2, 2009

Related U.S. Application Data

(60) Provisional application No. 60/996,770, filed on Dec. 5, 2007.

(51) Int. Cl.
*F01B 31/00* (2006.01)
*F16D 65/14* (2006.01)
(52) U.S. Cl. .............................. 92/110; 92/171.1
(58) Field of Classification Search .............. 92/110, 92/171.1; 188/77 R; 475/146
See application file for complete search history.

(56) References Cited

U.S. PATENT DOCUMENTS

| | | | | |
|---|---|---|---|---|
| 4,881,453 A | * | 11/1989 | Armstrong | 188/77 R |
| 5,235,899 A | * | 8/1993 | Hauser | 92/110 |
| 5,944,627 A | | 8/1999 | Darling-Owen et al. | |

* cited by examiner

*Primary Examiner* — Thomas E Lazo
(74) *Attorney, Agent, or Firm* — Timorhy J. Kilma; Shuttleworth & Ingersoll, PLC

(57) ABSTRACT

A servo for hydraulically operating a brake band of an automatic transmission includes a housing having a bore engaging portion for engaging an existing servo bore in a case of the automatic transmission and an external portion for positioning externally of the servo bore, the external portion of the housing including an interior bore. The servo also includes a piston disposed in the interior bore of the external portion of the housing for reciprocating movement, the piston being externally remote from the servo bore and having an outer diameter greater than an outer diameter of the servo bore. An actuator rod for engaging and operating the brake band of the automatic transmission is attached to the piston to reciprocate with the piston. The servo connects to existing hydraulic circuits within the servo bore to supply pressurized fluid for operating the servo.

8 Claims, 1 Drawing Sheet

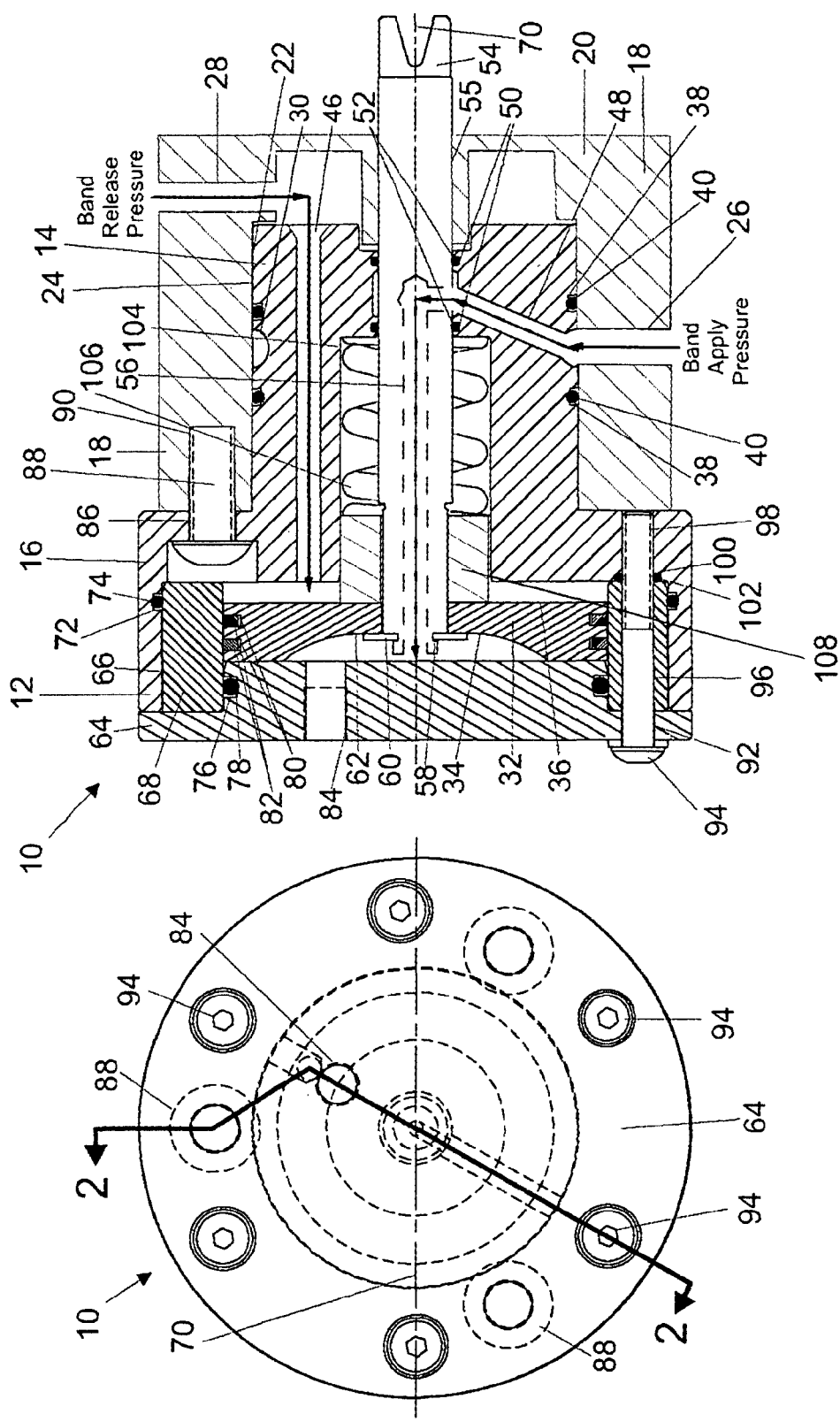

AUTOMATIC TRANSMISSION SERVO

This application claims priority to U.S. Provisional Patent Application 60/996,770, filed Dec. 5, 2007, of James C. BEATTIE Jr., entitled Automatic Transmission Servo, which application is incorporated by reference herein in its entirety.

The present invention relates to a servo for an automatic transmission. Such servos are hydraulically operated by pressurized fluid supplied by the transmission to engage/disengage a brake band of the automatic transmission. Conventional automatic transmissions such as the General Motors® Powerglide® have an integral casing that includes a relatively thin wall servo bore in which the conventional servo piston is installed. An actuator rod links the movable piston with the band for applying and releasing pressure to the band. The casing has an oil galley to the bore for supplying pressurized fluid to one side of the piston to apply the pressure to the band and clamp the band around the drum. The casing also has a second oil galley to the bore for supplying pressurized fluid to the other side of the piston to release the pressure from the band and unclamp the drum.

The present invention is an automatic transmission servo for hydraulically operating a brake band of an automatic transmission. The servo includes a housing having a bore engaging portion for engaging an existing servo bore in a case of the automatic transmission and an external portion for positioning externally of the servo bore, the external portion of the housing including an interior bore. The servo also includes a piston disposed in the interior bore of the external portion of the housing for reciprocating movement, the piston being externally remote from the servo bore and having an outer diameter greater than an outer diameter of the servo bore. An actuator rod for engaging and operating the brake band of the automatic transmission is attached to the piston to reciprocate with the piston. The servo further includes hydraulic circuitry for connecting to existing hydraulic circuits of the automatic transmission within the servo bore for supplying pressurized fluid from the hydraulic circuits of the automatic transmission to reciprocally move the piston and the actuator rod.

By utilizing a servo housing that has the two different portions, the bore engaging portion and the external portion, the servo of the present invention easily mounts to a conventional case of a conventional transmission utilizing the same structure that previously housed the conventional servo but, by positioning the piston external of the existing servo bore, allows a larger diameter piston to be used than is possible with the conventional arrangement. This has two effects. First, an increased apply force can be applied to the brake band because of the increased surface area of the piston that is exposed to the pressure apply fluid. This increased force is critical in holding the band tightly engaged and without slippage during first gear loading in extremely high horsepower vehicles. Second, the present invention servo creates increased band force without having to increase the line pressure of the pressure apply fluid, which increased line pressure robs engine power that could otherwise be used to accelerate the vehicle.

The invention will be described in further detail below in conjunction with the attached figures, where like reference numerals indicate like components.

FIG. 1 is a front plan view of a servo for an automatic transmission according to the present invention; and FIG. 2 is a sectional view of the servo of FIG. 1 viewed along section line 2-2 shown in FIG. 1.

The automatic transmission servo 10 of the present invention includes a housing 12 that has a bore engaging portion 14 and an external portion 16 that remains outside of the conventional case 18 of transmission 20 when the servo 10 is mounted to the case 18. The case 18 has a servo bore 22 which conventionally would house the conventional servo piston. However, with the present invention servo 10, the bore engaging portion 14 has an outer diameter 24 that is sized to provide a close fit in the servo bore 22. The case 18 also includes a first oil galley 26 running from a pressurized fluid source of the transmission 20 to the servo bore 22 to supply pressurized fluid for applying pressure to a brake band to clamp a drum of the transmission (as conventionally known, band and drum not shown) and a second oil galley 28 running from a pressurized fluid source of the transmission 20 to the servo bore 22 to supply pressurized fluid for releasing the pressure from the band and unclamping the drum.

The outer diameter 24 of the bore engaging portion 14 includes an oil groove 30 that runs at least partially around a circumference thereof, and in a preferred embodiment, completely around the circumference, to connect to and route pressurized oil from first oil galley 26 through an oil galley 480 to a pressure apply side 34 of piston 32. Oil groove 30 allows first oil galley 26 and oil galley 48 to be rotationally mis-aligned with one another but still operationally connected. Piston 32 also has a pressure release side 36 opposite the pressure apply side 34. Circumferential grooves 38 positioned on opposite sides of oil groove 30 in bore engaging portion 14 house o-rings 40 to provide an oil-tight seal between the first oil galley 26 and the oil groove 30. An oil galley 46 runs through housing 12 to connect the pressure release side 36 of piston 32 with oil galley 28 supplying the band release pressurized fluid. The speed of the band release is critical so that the 1-2 shift can be very fast to avoid delay in the release of the band that can overload the input shaft of the transmission and lead to premature failure of the input shaft. Extending the bore engaging portion 14 inwardly so that the opening of oil galley 46 is roughly adjacent oil galley 28 helps to minimize a volume into which the band release fluid can flow. By minimizing this volume, the band release operates quicker with the present invention servo 10. The opening of oil galley 46 is preferably chamfered or curved to aid oil flow. Alternatively, the servo 10 can be provided with external oil circuits for connecting to existing oil circuits of the transmission 20.

An actuator rod 54 connects between the piston 32 and the band. Oil galley 56 running through an interior of actuator rod 54 connects the pressure apply oil galley 26, via oil galley 48, to the pressure apply side 34 of the piston 32, supplying the pressurized fluid directly to the center of the pressure apply side of the piston 32. Servo housing 12 includes a pair of inner circumferential grooves 50 to house a pair of o-rings 52 positioned on opposite sides of oil galley 48 to seal between the oil galley 48 and the oil galley 56. Actuator rod 54 includes a circumferential groove 58 at a piston end thereof for receiving a retaining ring 60 for retaining piston 32 on actuator rod 54. Piston 32 includes a relief (or relieved portion) 62 to provide clearance between the end of the actuator rod 54, the retaining ring 62 and a housing cover 64 attached to the servo housing 12 to seal the interior of the servo 10. The case 18 of the transmission 20 includes an axially aligned bore 55 for reciprocally supporting and guiding the actuator rod 54.

Exterior portion 16 of servo housing 12 includes an interior bore 66 that engages and supports a cylindrical sleeve 68. Piston 32 engages an inner bore of sleeve 68 and reciprocates therein, along axis 70, via action of the pressure apply and pressure release fluids, to apply and release pressure, respectively, from the brake band. External portion 16 includes an inner circumferential groove 72 for housing an o-ring 74 to engage an outer diameter of sleeve 68 seal between the sleeve 68 and the housing 12. Housing cover 64 also includes a circumferential groove 76 to house an o-ring 78 that engages an inner diameter of sleeve 68 to seal between the housing cover 64 and the sleeve 68. An outer diameter of the piston 32 includes a pair of circumferential grooves 80 for housing a pair of piston rings 82 to engage the inner diameter of sleeve 68 and seal between the piston 32 and the sleeve 68. The positioning of the grooves, o-rings and piston rings can be exchanged between opposing components, and the number and placement of such can be altered as desired. Housing cover 64 also includes a threaded bore 84 for connecting to an external pressure gauge to monitor the band apply pressure. The threaded bore 84 can be sealed by a threaded fastener (not shown) if no external pressure gauge is used Exterior portion 16 of servo housing 12 includes three axially aligned fastener bores 86 positioned around a circumference thereof to accept three threaded fasteners 88 which engage three existing threaded bores 90 in the case 18 to securely mount the servo housing 12 to the case 18. The existing threaded bores 90 conventionally received threaded fasteners for mounting a conventional cover over the conventional servo mechanism. By providing an outer diameter of the external portion 16 of the housing 12 that allows the existing threaded bores 90 to be used for mounting the servo 10 to the case 18, the overall height of the servo 10 beyond the case 18 can be minimized so as to fit in most racing vehicles without modification to the chassis or body. In a preferred embodiment, the overall height of the servo 10 beyond the case 18 is no more than 2.0 inches.

Housing cover 64 includes a plurality of axially aligned fastener bores 92 positioned around a circumference thereof to accept a like plurality of threaded fasteners 94 which also pass through a like plurality of axially aligned fastener bores 96 in sleeve 68 to engage a like number of threaded bores 98 in the housing 12 to securely mount the housing cover 64 to the servo housing 12. The housing 12 can include a circular groove 100 positioned around each threaded fastener 94 to receive an o-ring 102 for creating an oil-tight seal between the sleeve 68 and the housing cover 64 (to prevent leakage via the fastener bores 92). The threaded bores 98, fastener bores 92 and fasteners 94 can alternatively be positioned radially outward of the sleeve 68, so that the threaded fasteners pass around the sleeve 68 and not through same.

Housing 12 includes an axially aligned bore 104 that houses a release spring 106 that engages the bore 104 and spacer bushing 108, which engages piston 32. A portion of the actuator rod 54 passes though spring 106, spacer bushing 108 and the bore 104. The spring 106 biases the piston 32 and actuator rod 54 in a pressure release position, even when there is no supply of pressure release fluid, and also assists in the band release function. This spring provides a greater spring force in a shorter spring height than is provided by a conventional spring arrangement of a conventional servo.

The cover 64 provides a positive stop against which the piston 32 can rest in the released state. On the other hand, the housing 12 is configured to give the necessary reciprocating travel for the piston 32 and actuator rod 54 so as to not prematurely stop pressure application to the band. Alternatively, only a single spring can be used, or, additional springs can be used, to alter the spring affect on the piston 32 and actuator rod 54.

By utilizing a servo housing 12 that has the two different portions, the bore engaging portion 14 and the external portion 16, the servo 10 of the present invention, easily mounts to any conventional OEM or aftermarket OEM style case 18 of a conventional transmission 20 utilizing the same structure that previously housed the conventional servo but, by positioning the sleeve 68 and piston 32 external of the existing servo bore 22, allows a larger diameter piston 32 to be used than is possible with the conventional arrangement. This has two effects. First, an increased apply force can be applied to the brake band because of the increased surface area of the piston that is exposed to the pressure apply fluid. This increased force is critical in holding the band tightly engaged and without slippage during first gear loading in extremely high horsepower vehicles. Second, with extremely high horsepower vehicles and conventional servos, it is difficult to achieve the necessary holding force during launch to prevent band slippage in first gear and to obtain satisfactory band life without increasing line pressure to undesirable pressure levels. The present invention servo 10 creates increased band force without having to increase the line pressure of the pressure apply fluid. This is important because increased line pressure requires greater power to generate, thereby robbing this power from the power available to propel the vehicle forward. That is, increased line pressure results in greater parasitic loss of the power available for launch, and can slow the acceleration of the vehicle. In fact, as discussed with respect to a specific example below, the present invention servo 10 allows line pressure to be reduced in certain situations, as compared to conventional transmission servos, thereby freeing up power for faster acceleration of the vehicle.

While the present invention servo 10 is currently constructed and dimensioned to fit Powerglide® transmissions, whether with OEM or aftermarket cases, the preset invention servo can also be used with other automatic transmissions with minor modifications and different dimensions.

In one preferred embodiment, the external portion 16 of the housing 12 has an outer diameter of 4.650 inches and an inner diameter of 4.250 inches. This provides for a 0.400 inch wall thickness. The sleeve 68 and piston 32 are exchangeable with alternative sleeve and piston sets to easily alter the diameter of the piston, and the applied hold force, without replacing the entire servo 10 or altering the line pressure. The sleeve 68 can even be omitted in an alternative embodiment, with the piston 32 and interior bore 66 correspondingly sized so that the piston 32 directly engages the interior bore 66. In one preferred embodiment, the piston 32 has an outer diameter of 3.250 inches (and the sleeve 68 has a corresponding inner diameter) such that the same hold force can be applied to the band at 200 psi line pressure that would otherwise require 300 psi line pressure with the maximum 2.750 inch diameter of the conventional piston of the conventional servo.

The servo housing, sleeve, piston and cover are preferably made of aluminum or other metal, or can also be made of appropriate plastics. It is preferred that the piston and sleeve be made of different materials or that one of them be coated to prevent a same material to same material friction operation. The o-rings are preferably made of Buna or Teflon®. Other materials can also be used.

Various aspects of the various embodiments can be combined in different configurations to create different embodiments. The present invention is not limited to the disclosed embodiments.

List of Components
10 automatic transmission servo
12 housing
14 bore engaging portion (of housing 12)
16 external portion (of housing 12)
18 transmission case
20 transmission 22 servo bore
24 outer diameter (of bore engaging portion 14)
26 first oil galley (band apply pressure)
28 second oil galley (band release pressure)
30 oil groove
32 piston
34 pressure apply side (of piston 32)
36 pressure release side (of piston 32)
38 circumferential grooves
40 o-rings
46 oil galley (pressure release in housing 12)
48 oil galley (pressure apply in housing 12)
50 inner circumferential grooves (of housing 12)
52 o-rings
54 actuator rod
55 actuator rod bore (in case 18)
56 oil galley (in actuator rod 54)
58 circumferential groove (on actuator rod 54)
60 retaining ring
62 piston relief
64 housing cover
66 interior bore (of external portion 16)
68 sleeve
70 axis
72 circumferential groove (of external portion 16)
74 o-ring
76 circumferential groove (of housing cover 64)
78 o-ring
80 circumferential grooves (of piston 32)
82 piston rings
84 threaded bore
86 fastener bores
88 threaded fasteners
90 threaded bores
92 fastener bores (in housing cover 64)
94 threaded fasteners
96 fastener bores (in sleeve 68)
98 threaded bores
100 circular groove (in housing 12)
102 o-ring
104 bore (in housing 12)
106 release spring
108 spacer bushing

What is claimed is:

1. An automatic transmission servo for hydraulically operating a brake band of an automatic transmission, comprising:
a housing having a bore engaging portion for engaging an existing servo bore in a case of the automatic transmission and an external portion for positioning externally of the servo bore, the external portion of the housing including an interior bore;
a piston disposed in the interior bore of the external portion of the housing for reciprocating movement, the piston being externally remote from the servo bore and having an outer diameter greater than an outer diameter of the servo bore;
an actuator rod for engaging and operating the brake band of the automatic transmission, the actuator rod attached to the piston to reciprocate with the piston; and
hydraulic circuitry for connecting to existing hydraulic circuits of the automatic transmission for supplying pressurized fluid from the hydraulic circuits of the automatic transmission to reciprocally move the piston and the actuator rod;
a cylindrical sleeve removably positioned between the interior bore of the external portion of the housing and the piston for reciprocally supporting the piston, such that the automatic transmission servo can be provided with alternative piston bore sizes by exchanging the cylindrical sleeve and piston in matched sets.

2. The automatic transmission servo of claim 1, and further comprising at least one oil seal positioned between an outer surface of the sleeve and the interior bore to provide an oil-tight seal therebetween.

3. The automatic transmission servo of claim 2, and further comprising:
a housing cover for enclosing the interior bore of the external portion of the housing;
at least one fastener for attaching the housing cover to the housing;
the sleeve including at least one axially aligned fastener bore passing therethrough to receive the at least one fastener such that the fastener can be attached to the housing.

4. The automatic transmission servo of claim 3, wherein the hydraulic circuitry for connecting to existing hydraulic circuits of the automatic transmission connects to the existing hydraulic circuits of the automatic transmission within the servo bore.

5. The automatic transmission servo of claim 4, wherein the pressurized fluid for the band apply is routed through the actuator rod oil galley.

6. The automatic transmission servo of claim 1, and further comprising:
a housing cover for enclosing the interior bore of the external portion of the housing;
at least one fastener for attaching the housing cover to the housing;
the sleeve including at least one axially aligned fastener bore passing therethrough to receive the at least one fastener such that the fastener can be attached to the housing.

7. The automatic transmission servo of claim 1, wherein the hydraulic circuitry for connecting to existing hydraulic circuits of the automatic transmission connects to the existing hydraulic circuits of the automatic transmission within the servo bore.

8. The automatic transmission servo of claim 1, wherein the actuator rod includes an oil galley therethrough and pressurized fluid for at least one of the band release and the band apply is routed through the actuator rod oil galley.

* * * * *